United States Patent [19]

Gerin et al.

[11] 4,143,643
[45] Mar. 13, 1979

[54] SOLAR HEAT TRAP WITH DOUBLE FLUID CIRCUITS

[76] Inventors: Albert A. Gerin, 7 rue des Ecoles; Claude G. Blanc, 5 rue du Moulin, both of Vinay (Isere), France

[21] Appl. No.: 768,212

[22] Filed: Feb. 14, 1977

[30] Foreign Application Priority Data

Nov. 6, 1976 [FR] France .................................. 76 34055

[51] Int. Cl.² ................................................ F24J 3/02
[52] U.S. Cl. ..................................... 126/271; 126/270; 237/1A; 136/89 PC
[58] Field of Search ............................. 126/270, 271; 136/89 PC; 237/1 A

[56] References Cited

U.S. PATENT DOCUMENTS

| | | | |
|---|---|---|---|
| 2,907,318 | 10/1959 | Awot | 126/271 |
| 3,866,285 | 2/1975 | Clark | 126/271 |
| 4,033,325 | 7/1977 | Walker | 126/271 |
| 4,045,246 | 8/1977 | Mlavsky et al. | 126/270 X |
| 4,055,163 | 10/1975 | Costello et al. | 126/271 |
| 4,059,094 | 11/1977 | Barrio de Mandoza | 126/271 |

Primary Examiner—William F. O'Dea
Assistant Examiner—Larry Jones
Attorney, Agent, or Firm—Remy J. VanOphem

[57] ABSTRACT

A solar heat collector apparatus is disclosed which includes a reflective surface of appropriate geometric form for receiving the solar radiation and reflecting said solar energy to a tube which is mounted at a point to maximize the collection of radiant energy. The collector is formed by moulding a plastic insulation material in a container which is then covered by a reflective metal film. The surface forms a series of compartments or cells which may be parabolic in shape. The cells communicate with each other to form a continuous fluid circuit. A second circuit is provided within the tube located in each compartment of the collector. The insulation characteristics of the container have been maximized to avoid heat losses through conducting parts.

9 Claims, 14 Drawing Figures

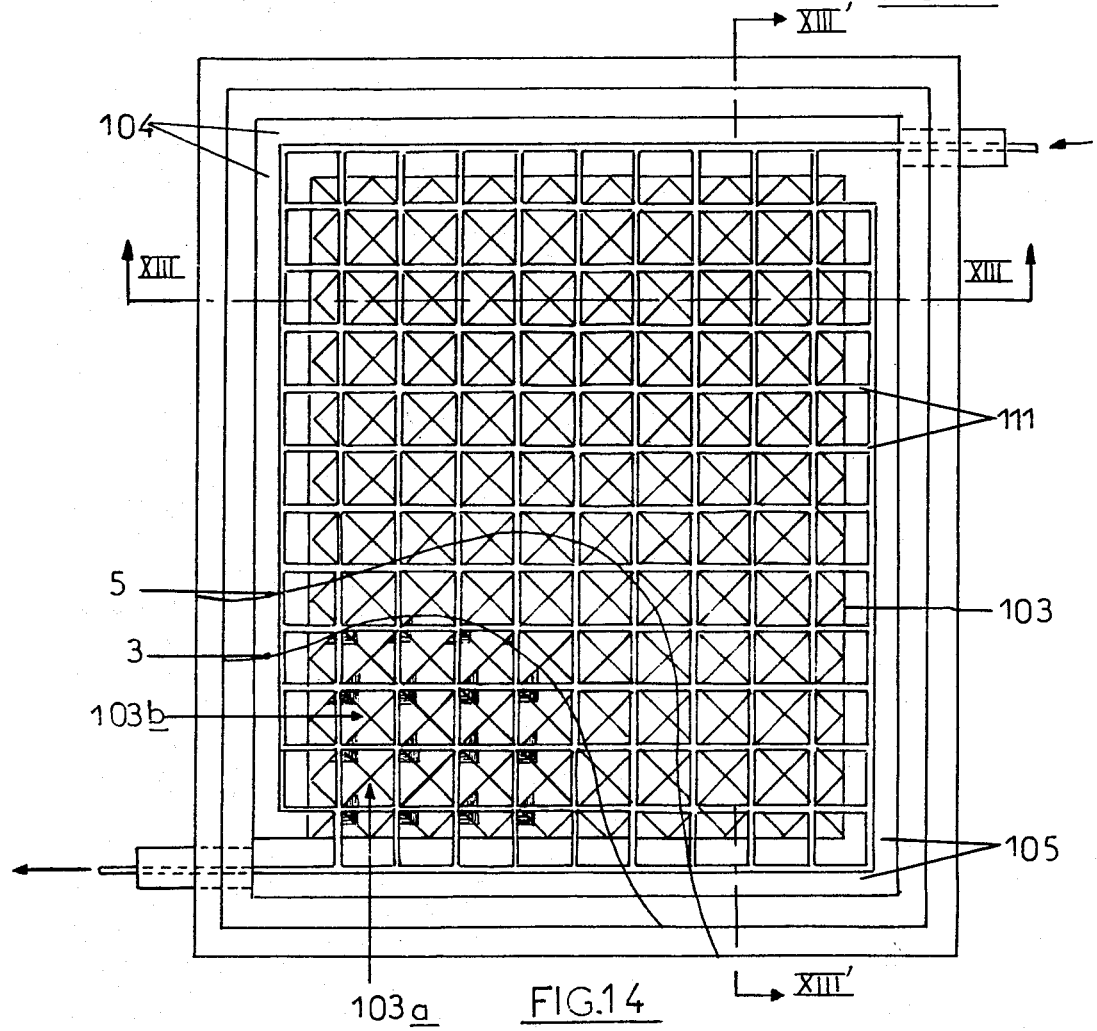

SOLAR HEAT TRAP WITH DOUBLE FLUID CIRCUITS

BACKGROUND OF THE INVENTION

The present invention relates to a solar heat-trap with double fluid circuits, one of the fluids flowing in reflective compartments or cells, whilst another fluid circulates in a circuit of tubes.

Flat heat-traps using the "greenhouse effect" to heat a fluid are already known. The known devices give only a mediocre output. Their construction is most commonly delicate and costly while their possible uses are limited.

SUMMARY OF THE INVENTION

The present invention is intended to remedy these disadvantages and to achieve a solar heat-trap with at least two fluid circuits gathering the solar heat, the flow in each of these circuits being regulable according to the use and the temperature rise required.

A solar heat-trap according to the invention comprises a network of tubes arranged in compartments defined by a reflecting surface of appropriate geometric form and by a plate transparent to light rays, and it is characterised in that the whole of the components which capture the solar energy is arranged in a container sealed by means which simultaneously ensure the watertightness of the compartments in which circulates one of the two fluids and the thermic insulation of the hot components in such a way as to avoid heat losses through conducting parts.

According to another characteristic, the fluid circulating in the network of tubes and the fluid flowing in the compartments or cells penetrate into and leave the heat-trap by a co-axial entry and exit for each of the separate circuits. At the entry the sections of the liquid flow openings are fitted with means of calibration which allow the control of the output of each fluid or of the relationship of the output in the circuits.

According to another characteristic, the compartments are manufactured by the moulding of a plastic material which is then coated, in a known way, with a reflecting metallic film, the cellular surface obtained forming a series of parabolic compartments communicating with each other by alternating baffles provided at the ends of the compartments so as to constitute a circuit of fluid flowing in all the compartments. In this method of manufacture the "compartment" fluid always flows either in the same direction or in the opposite direction to the flow of fluid which circulates in the separate network of tubes.

According to another characteristic, the network of tubes is constituted by a worm which passes from one cell to the next cell in the compartment through the baffles linking two adjacent cells, the longitudinal edges of each cell being possibly sealed to the transparent plate directed towards the sun's rays.

According to another characteristic, the worm is positioned on the focal line of the cells.

According to another characteristic, the heat-trap carries another transparent plate placed above the plate enclosing the "compartment" circuit of fluid, these two plates being assembled by a flexible peripheral seal which also constitutes an insulating compartment between the edges of the surface of the cells and the edges of the container walls.

According to another characteristic, the container of the heat-trap carries on its lateral walls:
- an internal flange fitted with an insulating strip on which the edges of the outside cells come to bear;
- an external flange provided with a clamping system acting on a second flange so as to compress the upper face of the flexible seal; and
- an insulating material placed below the reflecting surfaces of the cells.

According to another characteristic, the use of the heat-trap with at least two circuits of fluid makes it necessary for the trap to be positioned in the direction of the sun's rays, hence most commonly for it to be inclined to the horizontal, which gives rise to a hydrostatic force below the sealing glass of the compartments. At the thrust center of this force, the two transparent plates are fixed to the surfaces of the cells by means of a tube threaded at its ends to allow the fitting of clamping nuts, whilst in the part located between the two plates, this tube has its lateral walls pierced with holes which allow the layer of air to be ventilated and avoid the formation of condensation.

Other methods of manufacture are illustrated and described according to the Figures. It may already be noted that the control of the output, the possibility of reversing the directions of flow and the possibility of fitting several flat heat-traps according to the invention in series or in parallel considerably increases the usage capabilities of such a device which offers, for a low cost installation, a relatively high output.

BRIEF DESCRIPTION OF THE DRAWINGS

The attached drawings, given by way of non-limiting example, will allow the characteristics of the invention to be better understood.

FIG. 13 is a section along the lines XIII—XIII or XIII'—XIII' (FIG. 14) of another method of manufacture.

FIG. 14 shows, in plan view, a heat-trap with two networks of tubes and two perpendicular networks of reflecting cellular surfaces.

DETAILED DESCRIPTION OF THE PREFERRED EMBODIMENT

Figure 1:
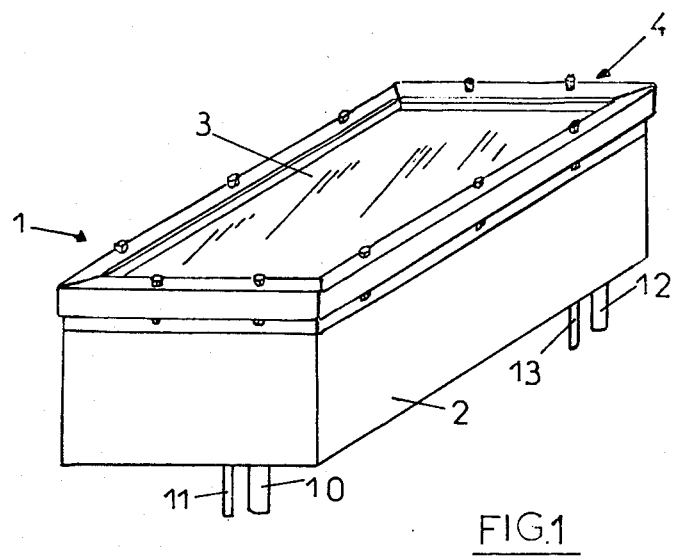
FIG. 1 is a general view of the external appearance of a solar heat-trap according to the invention.

There is shown in the FIG. 1 a solar heat-trap 1 comprising, inside a container 2, components for trapping solar energy. The upper face of the container is closed by a transparent plate 3 so as to utilise the "greenhouse effect". This plate is located and clamped by fixing means such as 4. These means are described later.

The heat collected by the trap is transmitted to at least two separate circuits of fluids which flow between the entries 10 (or 11) and the exits 12 (or 13).

Figure 2:
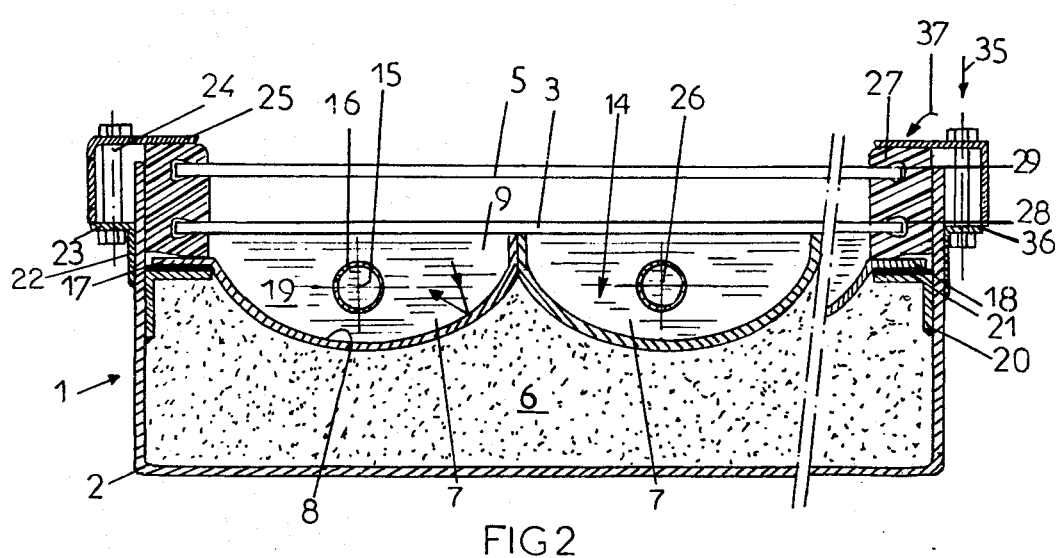
FIG. 2 is a section along the arrows II—II (FIG. 1) of the assembled components.

FIG. 2 shows, in section, a preferred type of construction of the heat-trap 1. The interior 2 holds an insulating material 6 above which is placed a surface composed of adjacent cells 7. The upper face of the geometrical surface 8 is reflecting. The surface 8 is, for example, a juxtaposition of compartments 9 of which the upper edges are closed by the transparent plate 3, whilst the hollows present a parabolic shape 14 which concentrates (by reflection) the sun's rays onto the focal line 15. Along each focal axis 15 there is positioned a straight part of a tube 16 forming a worm passing from one compartment to the next as will be seen later.

Inside the compartment 9 a first fluid 19 circulates, whilst in the worm or network of tubes 16 a second fluid 26 circulates. The two circuits are separate as shown in FIGS. 2, 3, 7, 9 and 10.

FIG. 2 also shows the details of the systems for enclosing and for thermal insulating the trapping components. The outer portion of the outside compartments of the heat-trap rests, terminates into edges 17 and 18, which rest on on the upper face of a flange 20 fixed (for example, welded) to the interior of the container 2. It is noted that a strip 21 of insulating material prevents thermal losses between the hot surface of the compartment and the external surface of the container.

Another flange 22 in the shape of an inverted L is fixed to the exterior of the container throughout its periphery. At intervals this flange is drilled with holes 23 for the fitting of a clamping and assembling component 24 which acts on the upper face of another L-shaped component 25, which bears on the one hand on the external edge of the flange 22 and on the other hand on the top of a flexible component 27.

The "greenhouse effect" is obtained in a known way, by a double transparent wall comprising the plate 3 and a second plate 5, these two plates being carried by peripheral grooves 28 and 29 cut in the flexible insulating seal 27.

Figure 4:
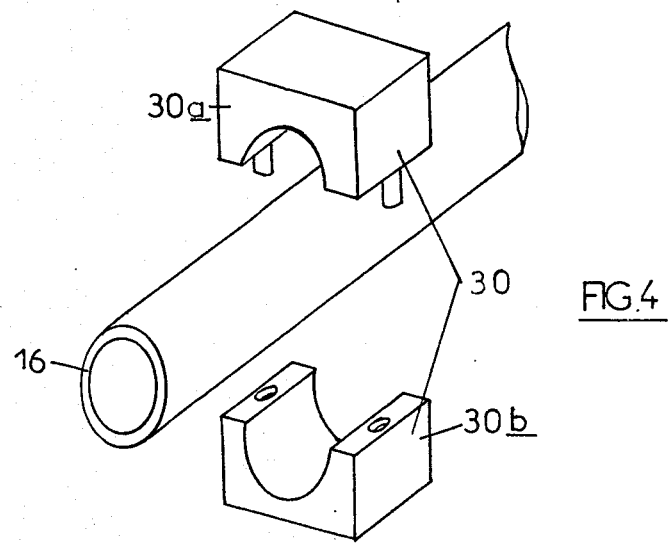
FIG. 4 is a detailed view of a collar for fixing the tubular worm.

The tube 16 is positioned on the focal axis of the compartments 9 by removable collars comprising for example a male component 30a capable of fitting onto a female component 30b fixed to the reflecting surface of the compartments as shown in FIG. 4.

Figure 3:
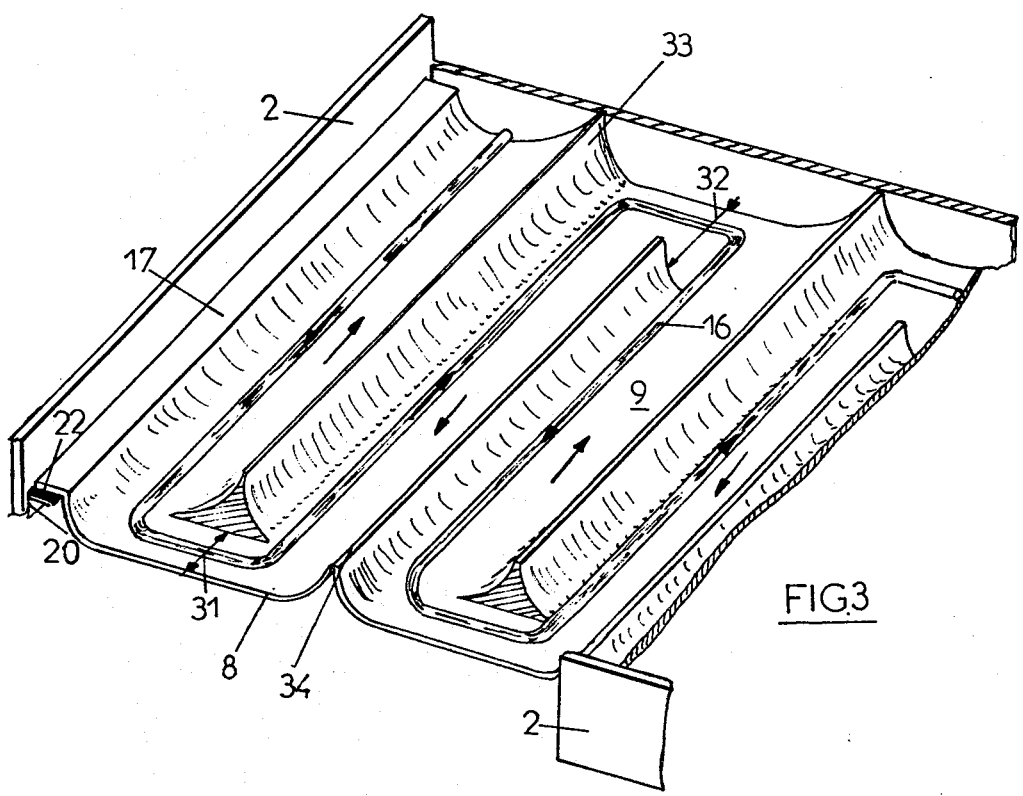
FIG. 3 illustrates a cellular surface with baffles.

FIG. 3 shows how the adjacent compartments 9 communicate with one another to form a single circuit of fluid in which the fluid flowing through the network of tubes 16 is submerged. The communication between the compartments is ensured by baffles provided alternately on the right and on the left of the trap. These baffles 31 and 32 are obtained by vertical walls 33 and 34 which do not extend as far as the walls of the container 2.

Figure 7:
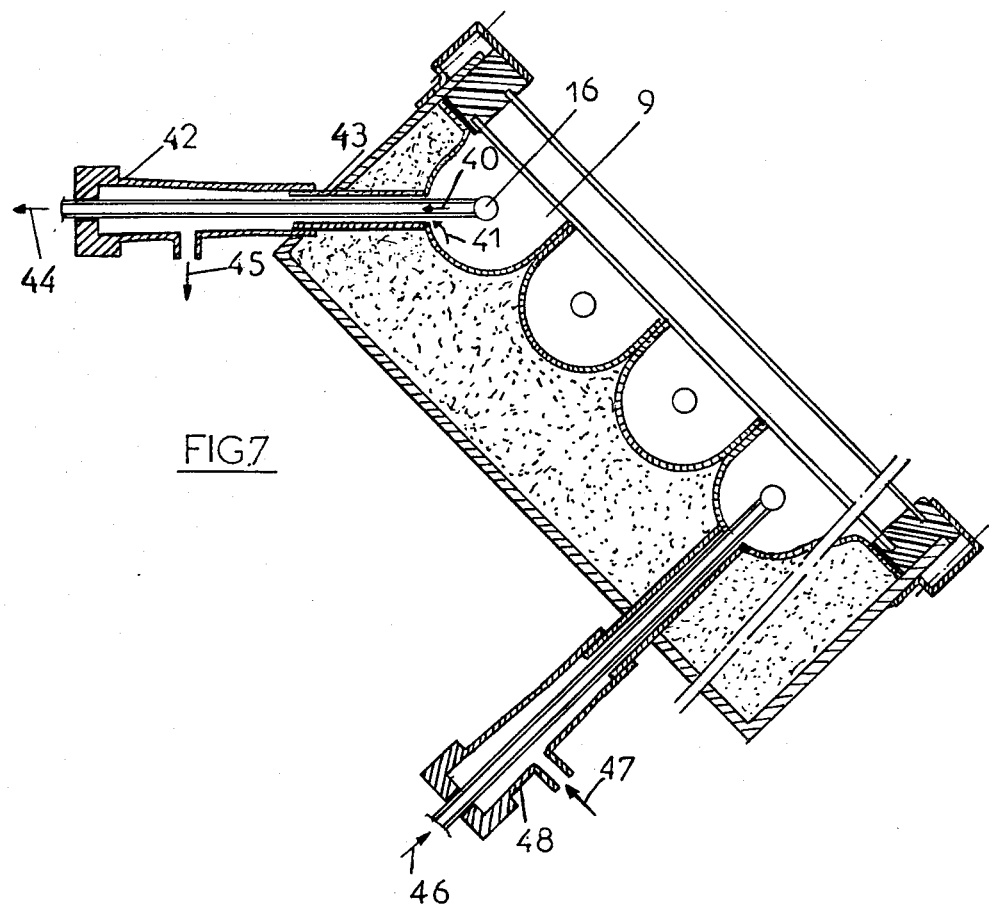
FIG. 7 is a section showing a heat-trap fitted with common entries and exits of fluids.

The assembly of the various components of the trap is carried out in the following manner:

(a) the insulating material 6 is put into the container 2 fitted with flanges 20 and 22, then the lower face of the compartments 9 is put onto this material;

(b) the reflective surfaces of the trap are insulated from the flanges 20 by interposing the insulating strip 21;

(c) the tubular network 16 is positioned, by means of collars such as 30, along the focal line of the reflecting parabolic surfaces 8; the external surface of the tubes is, for example, painted black if a maximum amount of calories is required in the fluid circulating in these tubes;

(d) the transparent plates 3 and 5 are located in the grooves of the insulating seal 27; the assembly 3; 5; 27 may then be placed inside the container above the surface 8 and the internal flange 20;

(e) the system of screws and nuts 24 is then tightened (arrow 35); the external flange 22 is rigid; the L-section 25 cooperates with this flange to form a fixed point at 36. It will be seen that tightening according to the arrow 35 causes a compression (arrow 37) of the peripheral flexible seal 27 (FIG. 2). This compression ensures that this seal bears on the internal flange 20, the interior plate 3 coming into contact with the tops of the vertical walls of each compartment;

(f) the circuits constituted on the one hand by the tubes 16 and on the other hand by the compartment 9 are connected to a fluid installation. An alternate construction is illustrated in FIG. 7. This construction has a tube exit co-axial with the compartment exit. The exits 40 and 41 are located at the highest point of the spaces containing fluid. The outlet tube of the network 16 passes through the container inside the outlet opening of the compartments 9. A "T" 42 screwed on to an outer ring 43 allows, as a result of the two fluid outlets, two separate installations to be supplied through 44 and 45 by means of a common exit 40, 41; and (g) the fluid inlets are similarly constructed through co-axial channels; in addition, the inlet openings 46 and 47 may be fitted with control devices allowing the outputs of each of the tube and compartment circuits to be modified or regulated. The relative control of the outputs may for example be obtained by means of a regulating "T" 48 of which the interior bore is conical. (FIG. 7).

Figure 5:
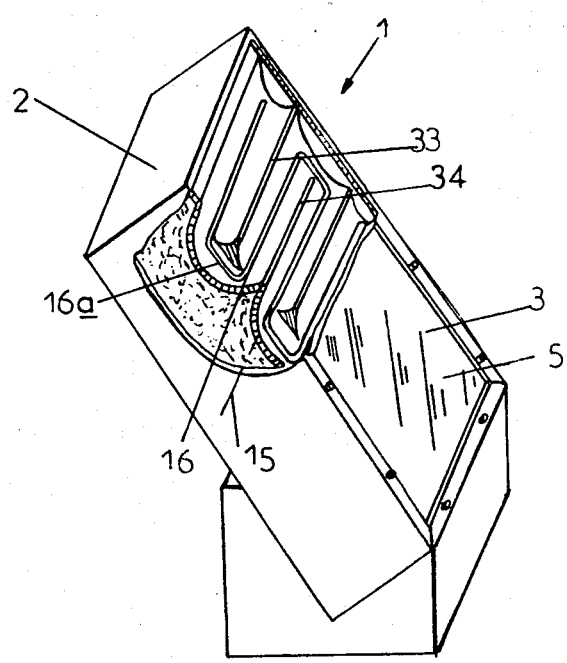
FIG. 5 shows, with a partial section of the container, the direction of the heat-trap in use.
Figure 6:
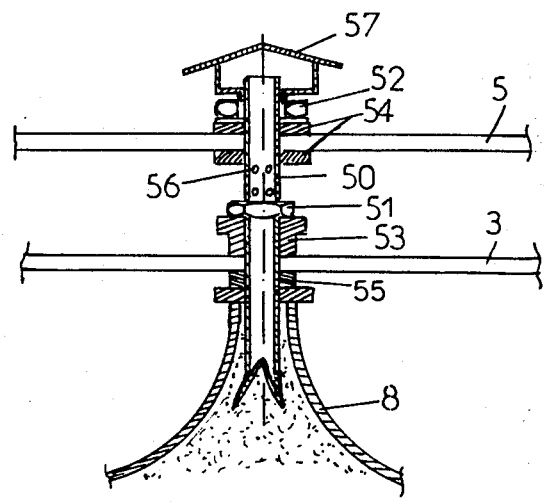
FIG. 6 is a detailed view of the fixing of the transparent walls in the pressure zone of the hydrostatic force.

It is known that the liquid (fluid) contained in the compartments exerts a thrust which tends to push away the internal sealing glass 3. This thrust is due to the hydrostatic force created when the flat trap is inclined to the horizontal in order to be directed at the sun. This force is exerted in a zone which may be calculated in relation to the inclination. For example, a trap used at a latitude of 40° to 50° N or S will be inclined at about 40° to the horizontal to obtain the best rate of energy capture as illustrated in FIG. 5. The separating walls 33, 34 ... between the compartments, the focal lines 15 and the straight portions 16a of the tubes are horizontal. The hydrostatic pressure is exerted on the glass 3 at about a third of its height from the base. In this zone a fixing system is fitted to ensure both the maintenance of the walls 3 and 5 on the chamber surface 8 and the ventilation of the space enclosed between the two transparent walls. This device, illustrated in FIG. 6, comprises:

a hollow tube 50, threaded at least at its ends;

nuts 51 and 52 able to be screwed onto the tube to tighten the seals 53 and 54 on each of the walls 3 or 5;

a seal support 55;

ventilation holes 56 pierced through the lateral walls of the tube, these holes lying between the two walls 3 and 5; and a protection cap 57 covering the top of the tube which opens to the air whilst its other end is fixed to the crest between the chambers.

The tightening of the nuts by screwing onto the tube 50 strengthen, at the point of thrust, the connection between the compartment surface, the interior glass 3 and the exterior glass 5. This connection retains a certain flexibility and gives good sealing thanks to the compression of the seals 53 and 54. Finally, the air holes 56 allow the sealed space enclosed between the two glasses to be ventilated. Thus condensation phenomena due to the difference in temperature between the hot glass 3 and the glass 5 are avoided.

A flat solar heat-trap according to the invention is essentially characterised by the fact that all the components heated by the trapping of solar energy are strictly insulated to the maximum degree. In addition, the sun's rays are distributed to at least two separate fluid (liquid) circuits. The exchange of calories between the two circuits is obtained both by radiation and by convection, practically without thermal loss. The distribution (and the apportionment) of the heat to the one or the other circuit may be easily controlled by the shape of the reflecting surfaces 8, the position of the network of tubes 16 and the surface aspect of the external surface of the tubes. It has been seen that this distribution, or rather the difference between the entry and exit temperatures of the fluid in a circuit may be modified by adjusting its output.

Figure 8:
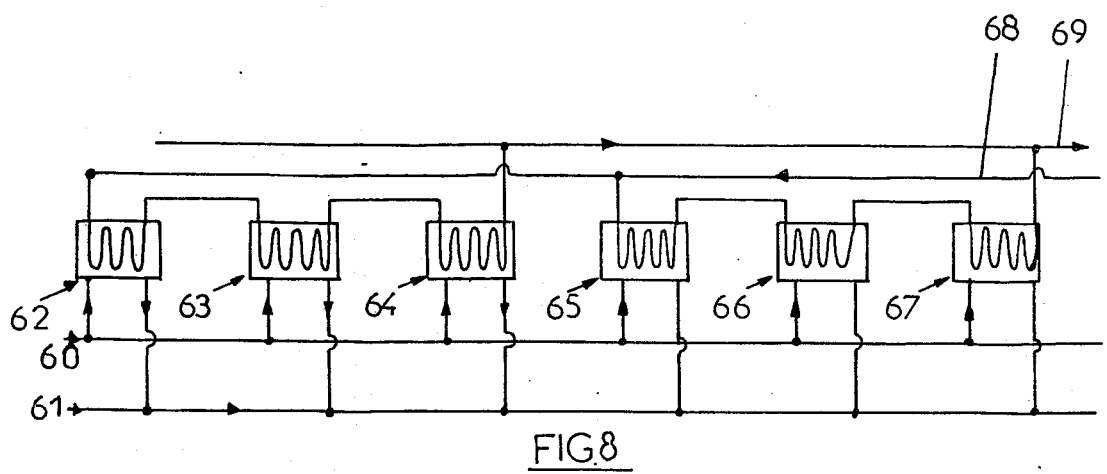
FIG. 8 is a schematic diagram of several heat-traps mounted in series.

Several panels or solar heat-traps may be linked to constitute an installation such as that shown in FIG. 8. The channels 60 and 61 are respectively the entry and exit channels for a fluid circulating in the compartments of the traps 62–67, these compartments being mounted in parallel on the circuit 60–61. In addition, the tubular networks of the traps 62–64 are arranged in series in the circuit with entry 68 and exit 69, whilst the networks of the traps 65–67, mounted in series are connected in parallel with the preceding series in the same fluid installation 68–69. Naturally numerous other mountings could be conceived. In particular, there could be several series of fluid intended for different installations.

Figure 9:
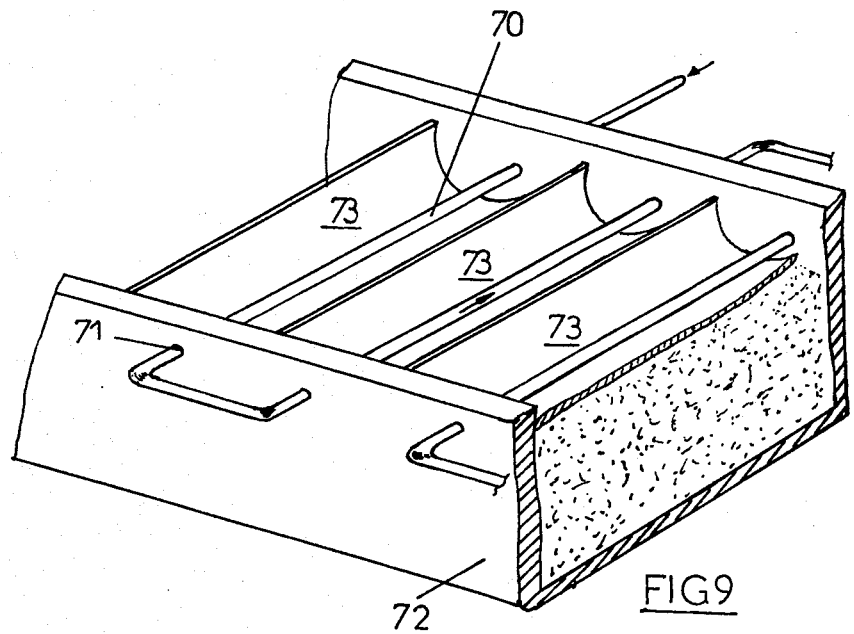
FIG. 9 shows a variant with a cellular surface without baffles.

There is shown in FIG. 9 a first manufacturing variant of a heat-trap. The cellular compartments no longer communicate by baffles, but each constitute a fluid circuit. The network of tubes 70 remains common to all the cells. It is located on the focal axis through openings 71 in the container 72 outside of which pass the connecting branches of the tubes. It is thus possible, by altering the direction of flow in the compartments 73, to obtain fluid outputs always in the same direction. For example, the outputs in the tubes 70 and in the compartments 73 are opposed to one another, or in the same direction if the flow of one of them is reversed.

Figure 10:
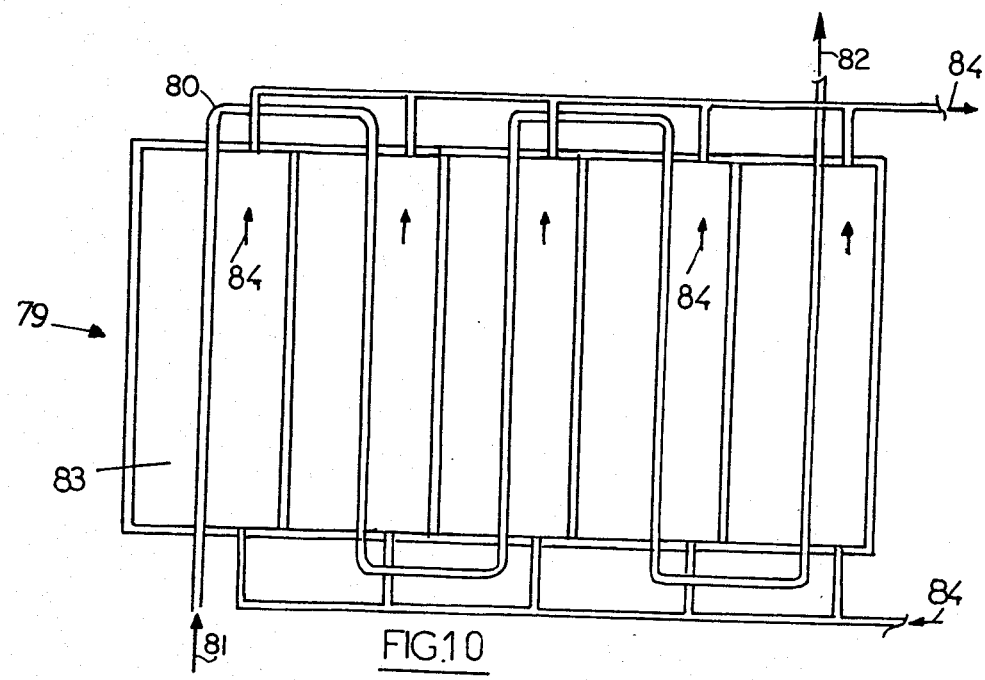
FIG. 10 illustrates, as seen from above, a method of feeding the "compartment" circuit and the directions of flow of the fluids.

Another variant is shown in FIG. 10. The baffles are suppressed but all the compartments 83 of the trap 79 are fed by the same circuit following the arrows 84. The flow in all the compartments is in the same direction. The network of tubes 80 forms a worm in which a fluid circulates, entering at 81 and leaving at 82. The tubes are located as previously. In this case, the flow of fluid in the tubes in one compartment is in the same direction as the flow of the "compartment" fluid, and in the opposite direction in the adjacent compartment. The fluid heating law varies from one compartment to another.

Figure 11:
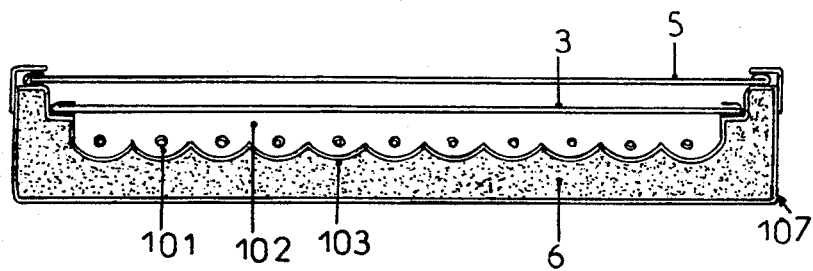
FIG. 11 is a section XI—XI (FIG. 12) of a manufacturing variant.
Figure 12:
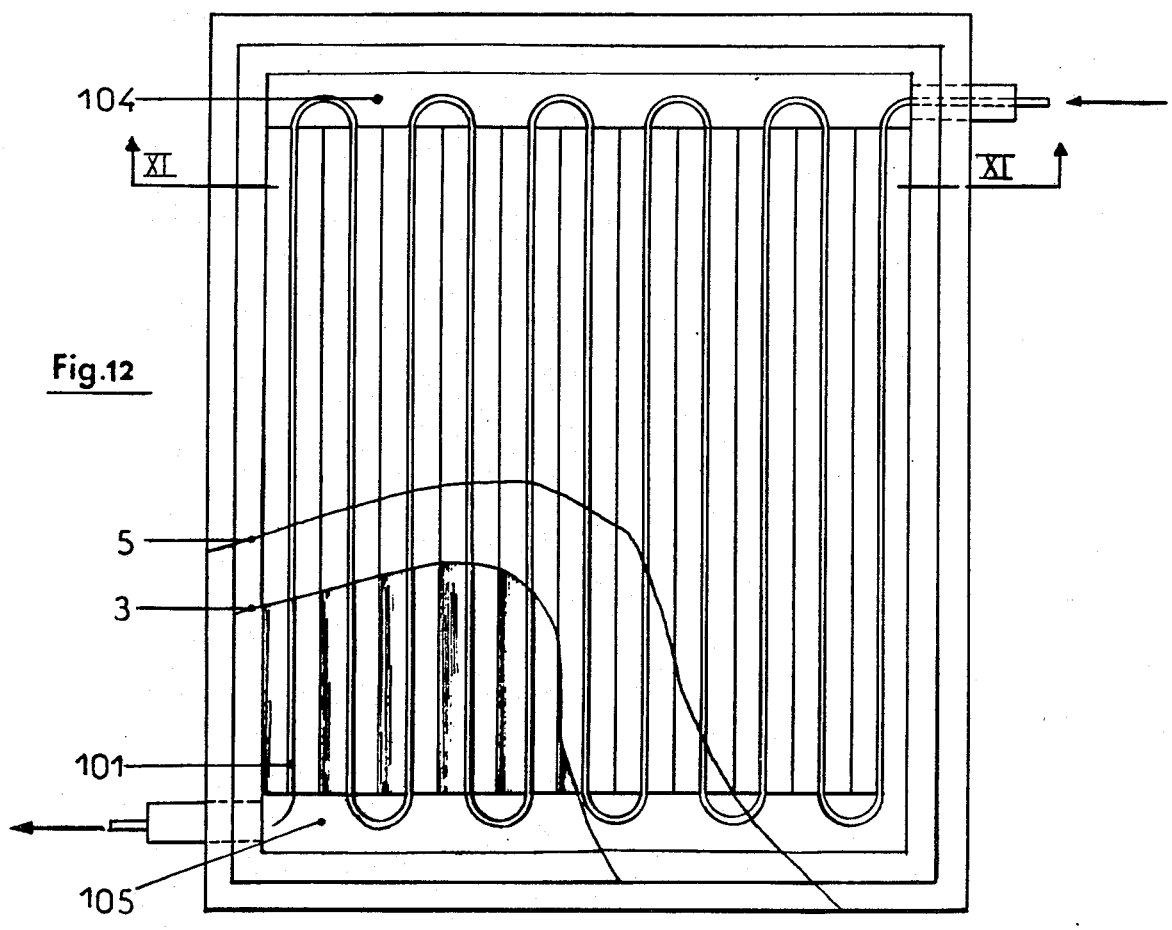
FIG. 12 is a plan view of a heat-trap corresponding to the construction of FIG. 11.

In the method of manufacture shown in FIGS. 11 and 12, the trap comprises the following components:

a continuous tube 101, blackened on the outside and arranged in straight parallel sections and linked one to another by tubular sections fitted near to the end baffles of the compartment; a liquid circulates in this tube;

a compartment 102, the bottom 103 of which constitutes a reflextive surface, made up of the juxtaposition of cells or elementary compartments of parabolic section giving focal lines along which the tubes 101 are placed;

two channels 104 and 105, one at the entry and the other at the exit of the fluid in the "compartment" circuit; and finally, the fully equipped sealed compartment is fitted in a container 107, itself closed by the transparent plate 5 parallel to the plate 3 of the compartment, so that the cushion of air enclosed between the two plates constitutes an insulating space.

As in previous constructions, the solar radiations are reflected and concentrated along the focal lines of the cells, hence onto the straight black portions of the tube circuit. The "compartment" circuit comprises a double baffle for each cell, whilst the fluid may also circulate between the upper edges of the cells and the internal plate 3. Finally, a thermal insulator 6 separates the walls of the container from those of the compartment.

Following another manufacturing method, illustrated in FIGS. 13 and 14, two tube-cell assemblies are combined, in such a way as to obtain on the one hand two orthogonal networks of tubes 110 and 111, and, on the other hand, two series of reflective cellular surfaces 103a and 103b cutting each other at right angles. The networks of tubes constitute a grid of tubes with a square mesh, whilst the reflecting surface is a checkerboard surface of cells.

Naturally, by connecting the two circuits of fluid at the outlet of the trap, it is possible to use the whole of the calories gathered by the two separate circuits in the same installation.

What I claim is:

1. A solar heat energy collector apparatus comprising:

a container;

reflecting surface means mounted within said container, said reflective surface means comprising:

a top side;

a bottom side opposite said top side; and peripheral edge means sealingly mounted to said container;

means for thermally insulating said reflective surface means from said container, said insulating means being in continuous contact with said bottom side of said reflective surface means;

transparent sealing means mounted to said container in spaced relationship to said reflecting surface means such that the apparatus disposed within said container is sealed, said transparent sealing means and said reflective surface means defining a first fluid chamber;

conduit means interposed between said transparent sealing means and said reflective surface means, said conduit means defining a second fluid chamber;

means for mounting said transparent sealing means to said container, said reflecting surface means comprises:

a plurality of geometrically formed compartments mounted side to side within said container, any two of said side by side mounted geometrically formed compartments having at least one juxtaposed edge in sealed communication with said transparent sealing means, said plurality of compartments each having inlet means; outlet means; and each compartment having at least one optical focal axis, said inlet means and outlet means communicating with said plurality of geometrically formed compartments to define a first fluid circuit;

said conduit means further comprises:

a plurality of tubular elements having inlet and outlet means, said plurality of tubular elements being within said plurality of compartments, each compartment having at least one tubular element mounted coaxially with said optical focal axis of said geometrically formed compartment, said inlet means, outlet means and plurality of tubular elements forming at least one network of tubes, defining a second fluid circuit, said network of tubes being blackened to absorb the solar calorific energy concentrated by said reflecting surface means on said plurality of tubular elements such that each tubular element in said first fluid circuit acts like a heating rod for the fluid circulating in said first fluid chamber;

means for mounting said plurality of tubular elements to said plurality of compartments;

wherein said fluid is a liquid and said inlet means of said plurality of tubular elements is coaxial with said inlet means of said plurality of geometrically formed compartments; and wherein, said outlet means of said plurality of tubular elements is coaxial with said outlet means of said plurality of geometrically formed compartments.

2. The solar heat energy collector apparatus as claimed in claims 1 further comprising:

first means for regulating the flow of fluid in said first fluid circuit and second means for regulating the flow of fluid in said second fluid circuit.

3. The solar heat energy collector apparatus as claimed in claim 2, wherein, said reflecting surface means comprises:

a first plurality of geometrically formed compartments mounted side to side within said container;

a second plurality of geometrically formed compartments mounted side to side at right angles to said first plurality of geometrically formed compartments, said first and second plurality of compartments being integral with each other to form an intersecting reflecting surface having at least one optical focal axis for each of said first plurality of geometrically formed compartments in one direction and at least one optical focal axis, at right angles to said one direction for each of said second plurality of geometrically formed compartments, said first and second plurality of geometrically shaped compartments further having inlet means and outlet means to form a first fluid circuit.

4. The solar heat energy collector apparatus as claimed in claim 3, wherein, said conduit means further comprises:

a first network of tubular elements disposed within said first fluid chamber coaxially with said optical focal axis for each of said first plurality of geometrically formed compartments;

a second network of tubular elements disposed within said first fluid chamber coaxially with said optical focal axis for each of said first plurality of geometrically formed compartments;

said first network of tubular elements communicating with said second network of tubular elements at their intersections to form an orthogonal tube network of tubes, said orthogonal network of tubes further having inlet means and outlet means to define a second fluid circuit such that any fluid entering said inlet means of said first and second plurality of geometrically formed surfaces flows across said reflective surface within said first fluid chamber towards said outlet means while any fluid entering said inlet means of said orthogonal tube network flows through said tube network towards said outlet means of said tube network independent of said fluid flow within said first fluid chamber.

5. The solar heat energy collector apparatus as claimed in claim 2 further comprising:

fixing means mounted to said juxtaposed edge of said any two compartments mounted side to side, said fixing means further comprising:

a tube attached to said juxtaposed edge, said tube having an external thread and being pierced with radial holes at the central portion; said holes lying within the air gap formed by the sealing means;

means for sealing said tube to said transparent sealing means when said transparent sealing means is mounted to said container; and means for supporting said transparent sealing means when said transparent sealing means is mounted to said container.

6. The solar heat energy collector apparatus as claimed in claim 2, wherein, said fluid is a liquid and, said means for mounting said transparent sealing means further comprises:

a first bracket mounted within said container for supporting one edge of at least one of said plurality of compartments mounted side to side; said bracket having a flange for supporting said one edge of said at least one of said plurality of compartments;

thermal insulating means interposed between said flange and said at least one edge of said plurality of compartments;

a second bracket mounted to the outside of said container;

a third bracket having a first flange mounted to said second bracket and a second flange communicating with said transparent sealing means;

means for backing said third bracket to said second bracket such that when said locking means is actuated, said second flange of said third bracket causes said transparent sealing means to thermally seal said container.

7. A solar heat energy collector apparatus comprising:

a container;

reflecting surface means mounted within said container, said reflective surface means comprising:

a top side;

a bottom side opposite said top side; and peripheral edge means sealingly mounted to said container;

means for thermally insulating said reflective surface means from said container, said insulating means being in continuous contact with said bottom side of said reflective surface means;

transparent sealing means mounted to said container in spaced relationship to said reflecting surface means such that the apparatus disposed within said container is sealed, said transparent sealing means and said reflective surface means defining a first fluid chamber;

conduit means interposed between said transparent sealing means and said reflective surface means, said conduit means defining a second fluid chamber;

means for mounting said transparent sealing means to said container, said reflecting surface means comprises:

a plurality of geometrically formed compartments mounted side to side within said container, said geometrically formed compartments further having inlet means; outlet means; and at least one optical focal axis; any two of said side by side mounted compartments having at least one juxtaposed edge in sealed communication with said transparent sealing means, said at least one juxtaposed edge further having a baffle to insure fluid communication between said side by side compartments such that said plurality of compartments mounted side by side within said container cooperate with said inlet and outlet means to define a first continuous fluid circuit;

said conduit means further comprises:

a plurality of tubular elements having inlet and outlet means, said plurality of tubular elements being within said plurality of compartments, each compartment having at least one tubular element mounted coaxially with said optical focal axis of said geometrically formed compartment, said inlet means, outlet means and plurality of tubular elements forming at least one network of tubes defining a second fluid conduit, said network of tubes being blackened to absorb the solar calorific energy concentrated by said reflecting surface means on said plurality of tubular elements such that each tubular element in said first fluid circuit acts like a heating rod for the fluid circulating in said first fluid chamber; and means for mounting said plurality of tubular elements to said plurality of compartments;

wherein said fluid is a liquid, and said inlet means of said plurality of tubular elements is coaxial with said inlet means of said plurality of geometrically formed compartments; and wherein, said outlet means of said plurality of tubular elements is coaxial with said outlet means of said plurality of geometrically formed compartments.

8. The solar heat energy collector apparatus as claimed in claim 7 further comprising:

first means for regulating the flow of fluid in said first fluid circuit and second means for regulating the flow of fluid in said second fluid circuit.

9. A solar heat energy collector apparatus comprising:

a container;

reflecting surface means mounted within said container, said reflective surface means comprising:

a top side;

a bottom side opposite said top side; and peripheral edge means sealingly mounted to said container;

means for thermally insulating said reflective surface means from said container, said insulating means being in continuous contact with said bottom side of said reflective surface means;

transparent sealing means mounted to said container in spaced relationship to said reflecting surface means such that the apparatus disposed within said container is sealed, said transparent sealing means and said reflective surface means defining a first fluid chamber;

conduit means interposed between said transparent sealing means and said reflective surface means, said conduit means defining a second fluid chamber;

means for mounting said transparent sealing means to said container; said reflecting surface means comprises:

a plurality of geometrically formed compartments mounted side to side within said container, any two of said side by side mounted geometrically formed compartments having at least one juxtaposed edge in sealed communication with said transparent sealing means, said plurality of compartments each having inlet means; outlet means; and each compartment having at least one optical focal axis, said inlet means and outlet means communicating with said plurality of geometrically formed compartments to define a first fluid circuit;

said conduit means further comprises:

a plurality of tubular elements having inlet and outlet means, said plurality of tubular elements being within said plurality of compartments, each compartment having at least one tubular element mounted coaxially with said optical focal axis of said geometrically formed compartment, said inlet means, outlet means and plurality of tubular elements forming at least one network of tubes, defining a second fluid circuit, said network of tubes being blackened to absorb the solar calorific energy concentrated by said reflecting surface means on said plurality of tubular elements such that each tubular element in said first fluid circuit acts like a heating rod for the fluid circulating in said first fluid chamber; and means for mounting said plurality of tubular elements to said plurality of compartments, said conduit means further comprises means for connecting said plurality of tubular elements to form a network of tubes wherein the flow can be controlled in opposing directions;

means for connecting said plurality of geometrically optical compartments to form a network of compartments wherein the flow of fluid is controlled in opposing directions.

* * * * *

UNITED STATES PATENT AND TRADEMARK OFFICE
CERTIFICATE OF CORRECTION

PATENT NO. : 4,143,643

DATED : March 13, 1979

INVENTOR(S) : Albert Antoine Gerin et al

It is certified that error appears in the above-identified patent and that said Letters Patent are hereby corrected as shown below:

Column 2, line 17, please delete the word "center" and insert therefore the word ----centre----.

Column 3, line 7, please delete the word "utilise" and insert therefore the word ----utilize----.

Column 3, line 33, please delete the word "on" first occurrence.

Column 6, line 9, please delete the word "reflextive" and insert therefore the word ----reflective----.

Column 9, line 37, please delete the word "conduit" and insert therefore the word ----circuit----.

Signed and Sealed this

Twenty-sixth Day of June 1979

[SEAL]

Attest:

RUTH C. MASON
*Attesting Officer*

DONALD W. BANNER
*Commissioner of Patents and Trademarks*